United States Patent [19]

Boothroyd et al.

[11] Patent Number: 5,435,000
[45] Date of Patent: Jul. 18, 1995

[54] CENTRAL PROCESSING UNIT USING DUAL BASIC PROCESSING UNITS AND COMBINED RESULT BUS

[75] Inventors: Donald C. Boothroyd, Phoenix; Mark T. Chase, Peoria; Russell W. Guenthner, Glendale, all of Ariz.

[73] Assignee: Bull HN Information Systems Inc., Billerica, Mass.

[21] Appl. No.: 65,105

[22] Filed: May 19, 1993

[51] Int. Cl.[6] ......................... G06F 15/40; H04L 1/00
[52] U.S. Cl. ..................................... 395/575; 371/68.3
[58] Field of Search .............. 395/575; 371/67.1, 68.1, 371/68.3

[56] References Cited

U.S. PATENT DOCUMENTS

| | | | |
|---|---|---|---|
| 4,358,823 | 11/1982 | McDonald | 364/200 |
| 4,853,932 | 8/1989 | Nitschke | 371/68 |
| 5,053,953 | 10/1991 | Patel | 364/200 |
| 5,195,101 | 3/1993 | Guenthner | 371/68.3 |
| 5,249,187 | 9/1993 | Bruckert | 371/68.1 |
| 5,263,034 | 11/1993 | Guenthner | 371/68.3 |
| 5,274,797 | 12/1993 | Barlow | 395/575 |
| 5,276,862 | 1/1994 | McCulley | 395/575 |
| 5,276,891 | 1/1994 | Patel | 395/775 |
| 5,283,870 | 2/1994 | Joyce | 395/200 |

Primary Examiner—Robert W. Beausoliel, Jr.
Assistant Examiner—Glenn Snyder
Attorney, Agent, or Firm—J. S. Solakian; J. H. Phillips

[57] ABSTRACT

In order to validate data manipulation results in a CPU which incorporates duplicate BPUs for integrity, which BPUs are typically each implemented on a single VLSI circuit chip, and which is capable of performing single and double precision data manipulation operations, two cache units are employed. Each cache unit is dedicated to handling half-bytes of information and incorporates highly reliable data validating logic without the necessity for providing double word wide output busses from each BPU. This feature, which lowers the lead count to each VLSI chip, is obtained by dedicating each cache unit to handling half-bytes of information. Each cache unit includes bit-by-bit comparison circuitry to validate the half-byte results received from both BPUs in the case of single precision operations, and, in the case of double precision operation, one cache unit employs the same bit-by-bit comparison circuitry to validate, for both cache units, the result parity bits, and hence the half-byte results, received from both BPUs.

12 Claims, 3 Drawing Sheets

CENTRAL PROCESSING UNIT USING DUAL BASIC PROCESSING UNITS AND COMBINED RESULT BUS

CROSS REFERENCE TO RELATED APPLICATION

1. CENTRAL PROCESSING UNIT USING DUAL BASIC PROCESSING UNITS AND COMBINED RESULT BUS AND INCORPORATING MEANS FOR OBTAINING ACCESS TO INTERNAL BPU TEST SIGNALS, Ser. No. 08/078,389, filed Jun. 17, 1993, by Donald C. Boothroyd and Bruce E. Flocken, and assigned to the same assignee as the present invention.

FIELD OF THE INVENTION

This invention relates to the art of data processing and, more particularly, to a central processing unit (CPU) using dual basic processing units (BPUs), dual cache units and a combined result bus to obtain a double word result while maintaining high data integrity.

BACKGROUND OF THE INVENTION

Powerful and reliable mainframe CPUs may incorporate duplicate BPUs which work independently to execute the same instruction or instruction series in parallel such that the results can be compared to insure identity. It has now become feasible to incorporate an entire BPU on a single Very Large Scale Integrated (VLSI) circuit which has the advantage of not only occupying less space, but also enjoys the capability to run faster. However, there is a practical limit to the number of conductive leads which can be connected to a VLSI circuit, and this characteristic becomes a problem when double precision data manipulation is performed. This problem arises because each of the duplicate BPUs has typically required a double word result bus which, for example in one computer family in which the present application finds application, means the provision of two 80-bit result buses, one coupled to each BPU. Those skilled in the art will appreciate that it would be highly desirable to obtain reliable double precision results without the necessity to provide double word result buses from each of duplicate BPUs. The present invention is directed to this end and to obtaining other desirable results which are a consequence of the implementation of the invention.

OBJECTS OF THE INVENTION

It is therefore a broad object of this invention to provide an improved CPU which incorporates duplicate BPUs for integrity, which BPUs are typically each implemented on a single VLSI circuit chip, and which is capable of performing single and double precision data manipulation operations.

It is a more specific object of this invention to provide a CPU incorporating duplicate BPUs and two cache units, each cache unit dedicated to handling half-bytes of information and incorporating highly reliable data validating logic without the necessity for providing double word wide output busses from each BPU.

SUMMARY OF THE INVENTION

Briefly, these and other objects of the invention are achieved by providing a CPU incorporating duplicate BPUs and two cache units, each cache unit being dedicated to handling half-bytes of information. Each cache unit includes bit-by-bit comparison circuitry to validate the half-byte results received from both BPUs in the case of single precision operations, and, in the case of double precision operation, one cache unit employs the same bit-by-bit comparison circuitry to validate, for both cache units, the result parity bits, and hence the half-byte results, received from both BPUs.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(s)

Figure 1:
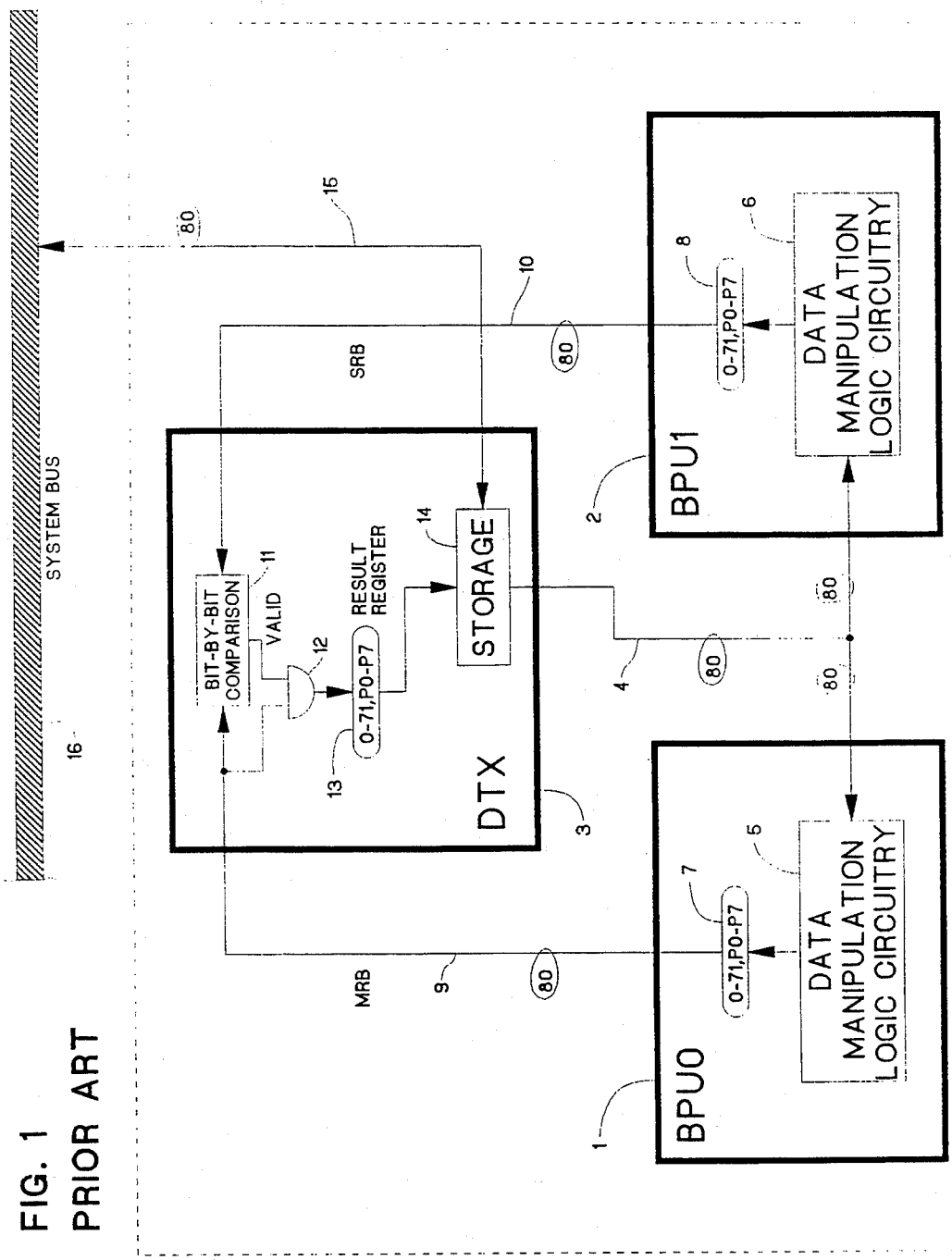
FIG. 1 is a block diagram of a typical prior art CPU incorporating duplicate BPUs and capable of performing single and double precision data manipulation and storing the validated results in a cache memory.

Referring first to FIG. 1, there is shown a block diagram of a typical prior art CPU incorporating duplicate BPUs which is capable of performing single and double precision data manipulation and storing the validated results in an internal cache memory. In the exemplary system, a data word is 36 bits wide, and each 9-bit data byte carries its own parity bit such that each full byte is 10 bits wide with the parity bit placed in the least significant bit position. Thus, a full single precision 4-byte word with parity information is 40 bits wide, and a double precision 8-byte word is 80 bits wide.

A first BPU (BPU0) 1 may be deemed the "master" BPU, and a second BPU (BPU1) 2 is the "slave" BPU. In operation, both BPUs 1, 2 receive the same information from a cache unit (DTX) 3, via 80-bit wide BPU input bus 4, and perform the same operations in redundant fashion in their respective data manipulation logic circuitry blocks 5, 6. The results, which should be identical, appear in respective buffer registers 7, 8. In the case of single precision operations, depending upon a given CPU design, only half the buffer registers 7, 8 may be used, or the single precision results may be duplicated in the upper and lower halves of each of the buffer registers. In the case of double precision operations, of course, each result is 80 bits wide. The master results are transferred to the cache unit 3 on master result bus (MRB) 9 while the slave results are similarly transferred to the cache unit on slave result bus (SRB) 10.

The results of each data manipulation operation, as obtained by each of the master and slave BPUs 1, 2, are compared, bit-by-bit, in comparison block 11 within the cache unit 3. (Bit-by-bit comparison circuits are well known in the art; for example, reference may be taken to the relevant disclosure, incorporated herein, in U.S. Pat. No. 5,195,101, the invention of which is assigned to the same Assignee as the subject invention.) If the results are identical, a "valid" signal issued by the comparison block 11 enables AND-gate array 12 to permit the master results to be transferred to result register 13 and thence to storage block 14. (It will be understood that if the results are invalid, appropriate error handling operations will be undertaken.) Information stored in or to be stored into the cache unit 3 may be made available to or received from other system components (e.g., other CPUs, I/O units, main memory, etc. not shown) via 80-bit wide input/output bus 15 and system bus 16 in the manner well known in the art.

It will be observed that both the MRB and the SRB are 80-bits wide such that, if a BPU is implemented on a single VLSI chip, the configuration of FIG. 1, which is capable of high performance in carrying out both double precision and single precision data manipulation operations, may not be usable because of the practical limitation on the number of conductive connections that can reliably be made to a single very dense and physically small VLSI chip.

Figure 2:
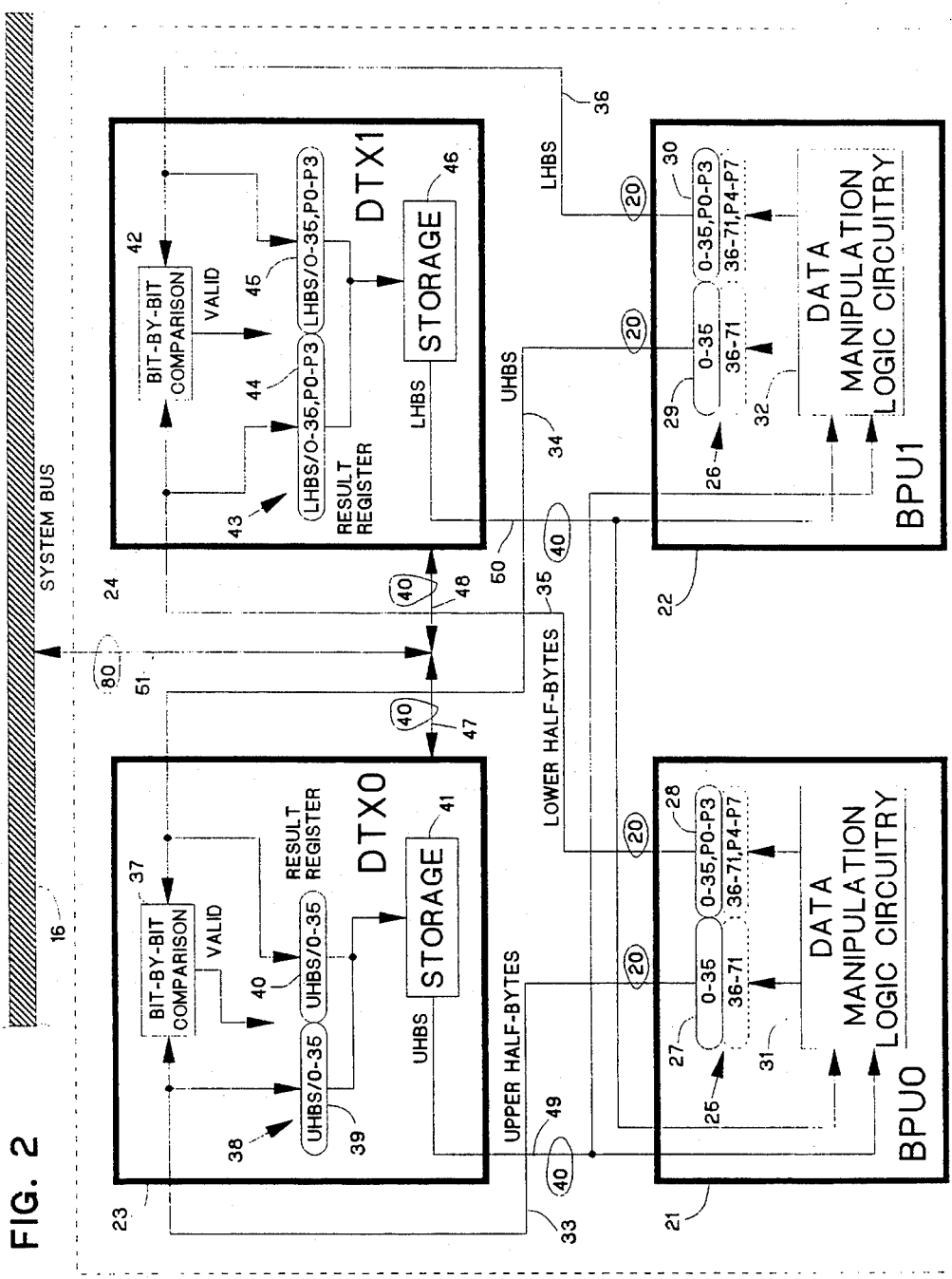
FIG. 2 is block diagram of a CPU according to the present invention shown configured to execute single precision data manipulation operations and cache stores.

Attention is now directed to FIG. 2 which illustrates in block diagram form the logic by which the present invention overcomes this obstacle in the performance of single precision data manipulation operations, the corresponding method becoming evident from the following description. In this configuration, BPU0 21 and BPU 1 22 are not related as master and slave, but rather are peers which, however, receive identical information on which to perform data manipulations in a manner similar to that performed by the BPUs previously discussed and shown in the prior an configuration of FIG. 1. BPU0 21 and BPU1 22 each communicate with cache units DTX0 23 and DTX1 24. Each buffer multiplexer, 25, 26, respectively, receives the results of a given data manipulation performed by the respective logic blocks 31, 32 into upper half-byte sections 27, 29 and lower half-byte sections 28, 30. The upper half-bytes from the buffer register sections 27, 29 are transferred to the cache units 23, 24 via respective 20-bit wide UHB busses 33, 34. Similarly, the lower half-bytes from the buffer register sections 28, 30 are transferred to the cache unit 23, 24 via respective 20-bit wide LHB busses 35, 36. Since, in the exemplary system, each data byte includes a parity bit in the least significant bit position, all the parity bits are resident in the lower half-bytes which are transferred to the cache unit 24.

For single precision operations, the exemplary system duplicates the results in the upper 27, 29 and lower 28, 30 halves of the buffer registers 25, 26 and in the cache units 23, 24. Those skilled in the art will understand that this design choice offers certain performance advantages which are not directly relevant to the present invention which is also adaptable to systems in which only single, non-duplicated, word results are stored for single precision operations.

In the cache unit DTX0 23, the upper half-bytes from each of the BPU0 21 and BPU 122 are compared for identity in the bit-by-bit comparison logic block 37 which issues a "valid" signal to transfer the data from BPUs 21, 22 into respective first 39 and second 40 halves of result register 38 and thence to storage block 41. Similarly, in the cache unit DTX1 24, the lower half-bytes from each of the BPU0 21 and BPU 122 are compared for identity in the bit-by-bit comparison logic block 42 which issues a "valid" signal to transfer the data from BPUs 21, 22 into respective first 44 and second 45 halves of result register 43 and thence to storage block 46. (For simplicity, the AND-gate arrays which correspond to AND-gate array 12 shown in FIG. 1 and which are responsive to the "valid" signals have been omitted.)

Thus, at the end of a data manipulation operation, the results, having been compared for identity and found valid, will have been stored into cache storage with the upper half-bytes stored in duplicate in the storage block 41 in the cache unit DTX0 23 and the lower half-bytes stored in duplicate in the storage block 46 of cache unit DTX1 24. 40-bit wide local input/output busses 47, 48 combine into 80-bit wide input/output bus 51 which is coupled to the system bus 16 for communication between the cache units 23, 24 with other system components. 40-bit wide cache-to-BPU busses 49, 50 are respectively used to transfer upper half-byte and lower half-byte data from the cache units 23, 24 to the BPUs 21, 22 for the subsequent performance of identical data manipulation operations.

It will be observed that, for single precision operations as illustrated in FIG. 2, the data output lines comprising the busses 33, 34 and 35, 36 from each of the BPUs 21, 22 to the cache units 23, 24 are only 40 lines, rather than 80 lines, wide such that the line counts to the VLSI chips incorporating the BPUs are reduced accordingly.

Figure 3:
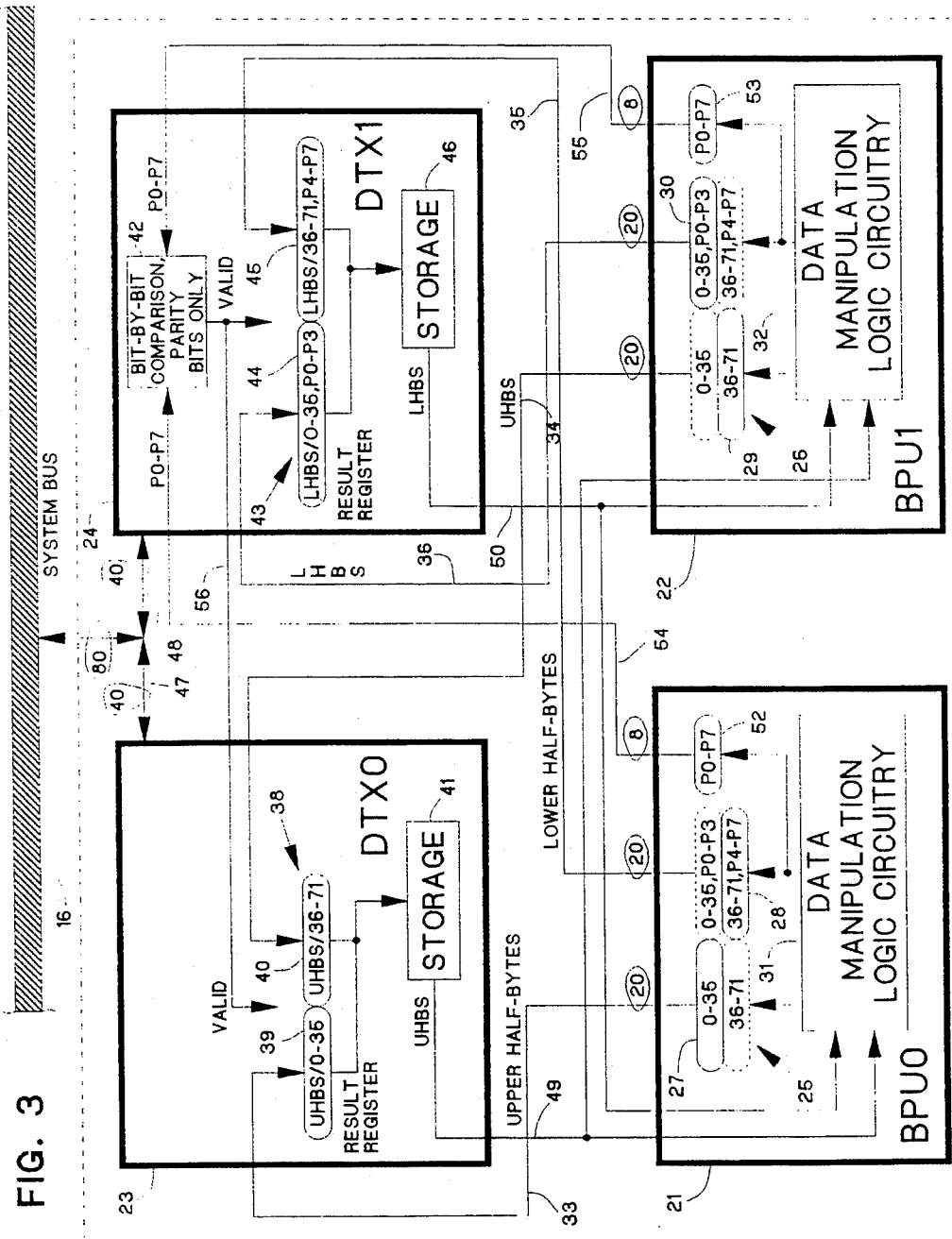
FIG. 3 is block diagram of a CPU according to the present invention shown configured to execute double precision data manipulation operations and cache stores.

Consider now the same apparatus as it performs double precision operations. Referring to FIG. 3, assume that the data manipulation blocks 31, 32 in the BPUs 21, 22 have been assigned a double precision operation. The double precision results will be placed in the buffer multiplexers 25, 26 such that: 1) the upper half-bytes of the low order word (data bits 0-35) are placed in the buffer register section 27 of the buffer multiplexer 25; 2) the upper half-bytes of the high order word (data bits 36-71) are placed in the buffer register section 29 of the buffer multiplexer 26; 3) the lower half-bytes (which include the parity bits) of the low order word (data bits 0-35) are placed in the buffer register section 28 of the buffer multiplexer 25; and the lower half-bytes (which include the parity bits) of the high order word (data bits 36-71) are placed in the parity buffer register section 30 of the buffer multiplexer 26. In addition, parity bit buffer registers 52, 53 in, respectively, the BPU0 21 and BPU1 22 receive the parity bits 0-7; i.e., each parity buffer register is loaded with a complete set of the parity bits present in the result generated by the data manipulation logic block resident in its BPU.

The complete sets of parity bits are respectively conveyed from the parity bit buffer registers 52, 53 to bit-by-bit comparison block 42 in cache unit DTX1 24 via parity busses 54, 55. If the two sets of parity bits are identical, the "valid" signal issues in the cache unit DTX1 24 to admit the lower half-bytes from each of the BPUs 21 and 22 into the result register 43 and thence to the storage block 46. In addition, this "valid" signal is coupled to the DTX0 23 by line 56 to enable the transfer of the upper half-bytes from each of the BPUs 21 and 22 into the result register 38 and thence to the storage block 41. Therefore, the complete, validated double precision result is stored in cache memory, the combination of the storage blocks 41 and 43, from which the data can be read to the BPUs 21 and 22 and/or the system bus 16 as previously described with respect to single precision operations.

In the case of double precision operations as illustrated in FIG. 3, the data output lines comprising the busses 33, 34, 54 and 35, 36, 55 from each of the BPUs 21, 22 to the cache units 23, 24 are 48 lines, rather than 80 lines, wide such that the line counts to the VLSI chips incorporating the BPUs are reduced accordingly. Since the same apparatus is employed for both single and double precision operations, it is this reduction from 80 to 48 output lines per BPU which represents the effective advantage over the prior art configuration.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A central processor adapted to selectively perform double precision data manipulation operations single and comprising:
   A) first and second basic processing units;
   B) first and second cache units;
   C) each of said first and second basic processing units including:
      1) data manipulation logic circuitry adapted to receive data from said cache units, to perform data manipulations thereon and to issue the data result of such manipulations;
      2) a data buffer register for receiving the data result from said data manipulation logic circuitry, said buffer register being divided into upper and lower sections temporarily storing, respectively, upper and lower half-bytes of the data result; and
      3) a parity buffer register for receiving a complete set of parity bits in the data result;
   D) each of said first and second cache units including:
      1) bit-by-bit comparison means adapted to receive first and second data words which should be identical and to issue a validating signal if the first and second data words are identical; and
      2) storage means;
   E) first and second upper-half busses;
      1) said first upper-half bus coupling said upper section of said data buffer register of said first basic processing unit to said bit-by-bit comparison means of said first cache unit for inputting the first data word input thereto during single precision operations; and
      2) said second upper-half bus coupling said upper section of said data buffer register of said second basic processing unit to said bit-by-bit comparison means of said first cache unit for inputting the second data word input thereto during single precision operation;
   F) first and second lower half busses;
      1) said first lower-half bus coupling said lower section of said data buffer register of said first basic processing unit to said bit-by-bit comparison means of said second cache unit for inputting the first data word input thereto during single precision operations; and
      2) said second lower-half bus coupling said lower section of said data buffer register of said second basic processing unit to said bit-by-bit comparison means of said cache unit for inputting the second data word input thereto during single precision operations;
   G) first and second parity busses;
      1) said first parity bus coupling said parity buffer of said first basic processing to one of said bit-by-bit comparison means for inputting the first data word input thereto during double precision operations; and
      2) said second parity bus coupling said parity buffer to said second basic processing unit to said one of said bit-by-bit comparison means for inputting the second data word input thereto during double precision operations;
   H) first transfer means responsive to the issuance of one said validating signals to transfer data on said first and second upper-half busses to said storage means of said first cache unit; and
   I) second transfer means responsive to the issuance of one of said validating signals to transfer data on said first and second lower-half busses to said storage means of said second cache unit.

2. A central processor in accordance with claim 1 which further includes:
   A) a first cache-to-BPU bus coupling said storage means of said first cache unit to said data manipulation logic circuitry of each of said first and second basic processing units for supplying upper half-byte data thereto; and
   B) a second cache-to-BPU bus coupling said storage means of said second cache unit to said data manipulation logic circuitry of each of said first and second basic processing units for supplying lower half-byte data thereto.

3. A central processor in accordance with claim 1 in which, during single precision operations:
   A) said first transfer means transfers data on said first and second upper-half busses to said storage means of said first cache unit in response to said validating signal issued by said bit-by-bit comparison means of said first cache unit; and
   B) said second transfer means transfers data on said first and second upper-half busses to said storage means of said second cache unit in response to said validating signal issued by said bit-by-bit comparison means of said second cache unit.

4. A central processor in accordance with claim 3 which further includes:
   A) a first cache-to-BPU bus coupling said storage means of said first cache unit to said data manipulation logic circuitry of each of said first and second basic processing units for supplying upper half-byte data thereto; and
   B) a second cache-to-BPU bus coupling said storage means of said second cache unit to said data manipulation logic circuitry of each of said first and second basic processing units for supplying lower half-byte data thereto.

5. A central processor in accordance with claim 3 in which each of said transfer means includes a result register.

6. A central processor in accordance with claim 5 which further includes:
   A) a first cache-to-BPU bus coupling said storage means of said first cache unit to said data manipulation logic circuitry of each of said first and second basic processing units for supplying upper half-byte data thereto; and
   B) a second cache-to-BPU bus coupling said storage means of said second cache unit to said data manipulation logic circuitry of each of said first and second basic processing units for supplying lower half-byte data thereto.

7. A central processor in accordance with claim 1 in which during double precision operations:
  B) said first transfer means transfers data on said first and second upper-half busses to said storage means of said first cache unit in response to said validating signal issued by said one bit-by-bit comparison means; and
  C) said second transfer means transfers data on said first and second upper-half busses to said storage means of said second cache unit in response to said validating signal issued by said bit-by-bit comparison means.

8. A central processor in accordance with claim 7 which further includes:
  A) a first cache-to-BPU bus coupling said storage means of said first cache unit to said data manipulation logic circuitry of each of said first and second basic processing units for supplying upper half-byte data thereto; and
  B) a second cache-to-BPU bus coupling said storage means of said second cache unit to said data manipulation logic circuitry of each of said first and second basic processing units for supplying lower half-byte data thereto.

9. A central processor in accordance with claim 7 in which each of said transfer means includes a result register.

10. A central processor in accordance with claim 9 which further includes:
  A) a first cache-to-BPU bus coupling said storage means of said first cache unit to said data manipulation logic circuitry of each of said first and second basic processing units for supplying upper half-byte data thereto; and
  B) a second cache-to-BPU bus coupling said storage means of said second cache unit to said data manipulation logic circuitry of each of said first and second basic processing units for supplying lower half-byte data thereto.

11. A central processor in accordance with claim 1 in which each of said transfer means includes a result register.

12. A central processor in accordance with claim 11 which further includes:
  A) a first cache-to-BPU bus coupling said storage means of said first cache unit to said data manipulation logic circuitry of each of said first and second basic processing units for supplying upper half-byte data thereto; and
  B) a second cache-to-BPU bus coupling said storage means of said second cache unit to said data manipulation logic circuitry of each of said first and second basic processing units for supplying lower half-byte data thereto.

* * * * *